(12) United States Patent
Okuno

(10) Patent No.: US 6,977,672 B1
(45) Date of Patent: Dec. 20, 2005

(54) INFORMATION CONTROL SYSTEM USING CAMERA

(75) Inventor: Yasuhiro Okuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/527,760

(22) Filed: Mar. 17, 2000

(30) Foreign Application Priority Data

Mar. 23, 1999 (JP) .................................. 11-078605
Mar. 10, 2000 (JP) ............................. 2000-067090

(51) Int. Cl.⁷ .......................... G05B 15/00; G09G 5/00; H04N 5/225; H04N 7/18; H04N 5/222
(52) U.S. Cl. ............ 348/207.11; 348/160; 348/333.02; 348/211.3; 700/83; 345/740
(58) Field of Search ................................ 348/153, 154, 348/155, 158, 159, 207.99, 207.1, 207.2, 348/211.99, 211.2, 211.3, 211.6, 211.8, 211.9, 348/211.11, 211.12, 211.14, 552, 160, 333.02, 348/239; 715/740; 700/83

(56) References Cited

U.S. PATENT DOCUMENTS

| | | | |
|---|---|---|---|
| 5,742,521 A * | 4/1998 | Ellenby et al. ............. 702/127 |
| 5,802,492 A | 9/1998 | DeLorme et al. |
| 5,815,411 A * | 9/1998 | Ellenby et al. ............. 702/150 |
| 5,838,250 A * | 11/1998 | Maekawa ................... 348/143 |
| 6,023,241 A * | 2/2000 | Clapper ................. 342/357.13 |
| 6,037,936 A * | 3/2000 | Ellenby et al. ............. 715/764 |
| 6,133,947 A | 10/2000 | Mikuni |
| 6,182,116 B1 * | 1/2001 | Namma et al. ............. 709/204 |
| 6,198,479 B1 * | 3/2001 | Humpleman et al. ....... 709/201 |
| 6,208,376 B1 | 3/2001 | Tanaka et al. |
| 6,266,082 B1 * | 7/2001 | Yonezawa et al. .......... 348/159 |
| 6,271,840 B1 | 8/2001 | Finseth et al. |
| 6,278,461 B1 * | 8/2001 | Ellenby et al. ............. 345/427 |
| 6,282,362 B1 * | 8/2001 | Murphy et al. ............... 386/46 |
| 6,307,556 B1 * | 10/2001 | Ellenby et al. ............. 345/427 |
| 6,335,722 B1 * | 1/2002 | Tani et al. .................. 345/173 |
| 6,463,343 B1 * | 10/2002 | Emens et al. ................. 700/83 |
| 6,580,950 B1 * | 6/2003 | Johnson et al. ............... 700/17 |
| 6,608,649 B2 | 8/2003 | Suzuki et al. |
| 6,625,812 B2 * | 9/2003 | Abrams et al. ............. 725/105 |
| 6,654,060 B1 * | 11/2003 | Kurosawa et al. ..... 348/333.02 |
| 6,661,966 B1 * | 12/2003 | Furuyama et al. ............ 386/65 |
| 6,690,979 B1 * | 2/2004 | Smith .......................... 700/65 |
| 6,734,879 B2 * | 5/2004 | Hasha et al. ................. 715/737 |

(Continued)

FOREIGN PATENT DOCUMENTS

JP        06054220 A  *  2/1994  ............ H04N 5/00

OTHER PUBLICATIONS

U.S. Appl. No. 09/527,984, filed Mar. 17, 2000.

Primary Examiner—Thai Tran
Assistant Examiner—John M. Villecco
(74) Attorney, Agent, or Firm—Morgan & Finnegan, L.L.P.

(57) ABSTRACT

It is an object to provide an information control system capable of executing a desired action in accordance with the angle position of a camera. This system includes an action storage unit for storing the image sensing range of the camera and the contents of actions corresponding to the image sensing range, a comparing unit for comparing the current image sensing range of the camera with the contents stored in the action storage unit, and an action activating unit for activating an action corresponding to the image sensing range of the camera on the basis of the comparison result obtained by the comparing unit.

42 Claims, 20 Drawing Sheets

U.S. PATENT DOCUMENTS

2001/0009429 A1 * 7/2001 Soto et al. .................... 347/19
2003/0007104 A1 * 1/2003 Hoshino et al. ............ 348/734
2003/0018753 A1 * 1/2003 Seki ........................... 709/219
2003/0200308 A1 * 10/2003 Tameda et al. ............. 709/224

* cited by examiner

FIG. 5

| | | | | | | |
|---|---|---|---|---|---|---|
| 10 | 15 | -25 | -20 | 50 | 55 | Program1 arg1 arg2 |
| 20 | 22 | 0 | 5 | 10 | 60 | Program2 |
| -5 | -10 | 4 | 8 | 50 | 60 | Program3 |

INFORMATION CONTROL SYSTEM USING CAMERA

FIELD OF THE INVENTION

The present invention relates to an information control system using a monitoring system capable of capturing moving images from a video camera, distributing them, and controlling the angle position of the camera (performing panning, tilting, and zooming operation).

BACKGROUND OF THE INVENTION

Conventionally, a monitoring system capable of distributing pictures from a video camera and remotely controlling the angle position, i.e., the panning and tilting position, zoom magnification, and the like, of the camera is available.

A camera (or a camera and a panhead on which the camera is mounted) used in such an apparatus allows a user to perform panning, tilting, and zooming operations by sending control signals from a computer to the camera through an RS-232C cable or the like.

This conventional monitoring system has, for example, an arrangement like the one shown in FIG. 2.

Referring to FIG. 2, a camera server 202 is connected to a network 201, and a camera 203 is connected to the camera server 202. A camera client 204 is also connected to the network 201. The camera client 204 instructs the camera server 202 to control the camera, and receives and displays a picture sent from the camera server 202.

FIG. 3 schematically shows the operation screen of the camera client 204. This operation screen includes an scroll box 31 in the form of a scroll bar which is used to perform panning operation, scroll boxes 32 and 33 for tilting and zooming operations, a control right button 34 for obtaining a camera control right from the camera server, and a picture display unit 35 for displaying a picture sensed by the camera.

Referring to FIG. 2, when the user performs panning, tilting, and zooming operations on the camera client 204, the camera client 204 transmits camera parameters (e.g., panning, tilt, and zoom values) designated by the user as a control command 205 to the camera server 202 through the network 201. Upon receiving a control command 206, the camera server 202 issues a control signal 207 to the camera 203 to control the camera 203. The camera server 202 changes the state of the camera first, and then notifies all connected camera clients of the current state (panning, tilt, and zoom values and the like) of the camera as camera data 208. Each camera client receives camera data 209 and recognizes the change in the current state of the camera.

Since the camera server 202 transmits camera data to all the connected camera clients, even a camera client 210 that is not controlling the camera can receive the camera data and recognizes the change in current state of the camera.

In addition, the camera server 202 also distributes picture data to all the camera clients through the network independently of the camera data.

If a plurality of cameras are connected to one camera server, one of the cameras can be dynamically designated, and the target camera can be changed to the designated one in accordance with a request from a camera client.

Owing to the feature of allowing many users to control one camera, this conventional system is based on the idea of a control right that allows only one user to control the camera for a predetermined period of time. Each user must acquire this control right before operating the camera. Camera control commands include a control right acquisition command. This command is issued when the user presses the control right button 34 in FIG. 3.

According to the prior art described above, when the camera is controlled, only a picture is provided in accordance with the angle position of the camera, but information about the main object of the picture cannot be obtained.

SUMMARY OF THE INVENTION

The present invention has been made in consideration of the above problem, and has as its object to provide an information control system which can implement a desired action in accordance with the angle position of a camera.

In order to achieve the above object, according to an aspect of the present invention, there is provided an information control apparatus having control means for controlling a image sensing range of a camera, comprising: storage means for storing a program for operating a predetermined action; acquisition means for acquiring information about a current image sensing range of the camera; control means for activating the program stored in said storage means in accordance with the information acquired by said acquisition means.

According to another aspect of the present invention, there is provided an information control apparatus having display means for displaying an image sensed by a camera, comprising: storage means for storing a program for operating an action for displaying a predetermined window together with an image displayed by said display means; acquisition means for acquiring information about a current image sensing range of the camera; and control means for activating the program stored in said storage means in accordance with the information acquired by said acquisition means, thereby executing display control of the predetermined window.

According to still another aspect of the present invention, there is provided an information control method having the control step of controlling a image sensing range of a camera, comprising: the storage step of storing a program for operating a predetermined action; the acquisition step of acquiring information about a current image sensing range of the camera; and the control step of activating the program stored in the storage step in accordance with the information acquired in the acquisition step.

According to still another aspect of the present invention, there is provided an information control method having the display step of displaying an image sensed by a camera, comprising: the storage step of storing a program for operating an action for displaying a predetermined window together with an image displayed in the display step; the acquisition step of acquiring information about a current image sensing range of the camera; and the control step of activating the program stored in the storage step in accordance with the information acquired in the acquisition step, thereby executing display control of the predetermined window.

According to still another aspect of the present invention, there is provided a computer-readable medium used for an information control method having the control step of controlling a image sensing range of a camera and storing a program comprising program codes of: the storage step of storing a program for operating a predetermined action; the acquisition step of acquiring information about a current image sensing range of the camera; and the control step of activating the program stored in the storage step in accordance with the information acquired in the acquisition step.

According to still another aspect of the present invention, there is provided a computer-readable medium used for an information control method having the display step of displaying an image sensed by a camera and storing a program comprising program codes of: the storage step of storing a program for operating an action for displaying a predetermined window together with an image displayed in the display step; the acquisition step of acquiring information about a current image sensing range of the camera; and the control step of activating the program stored in the storage step in accordance with the information acquired in the acquisition step, thereby executing display control of the predetermined window.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a view for explaining an action list file format;

DETAILED DESCRIPTION OF THE PREFERRED EMBODIMENTS

The preferred embodiments of the present invention will be described below with reference to the accompanying drawings.

First Embodiment

The first embodiment of the present invention will be described below.

Since techniques for picture transmission and reception are the same as those used in the prior art, a description thereof will be omitted. Camera control will be mainly described below.

Figure 1:
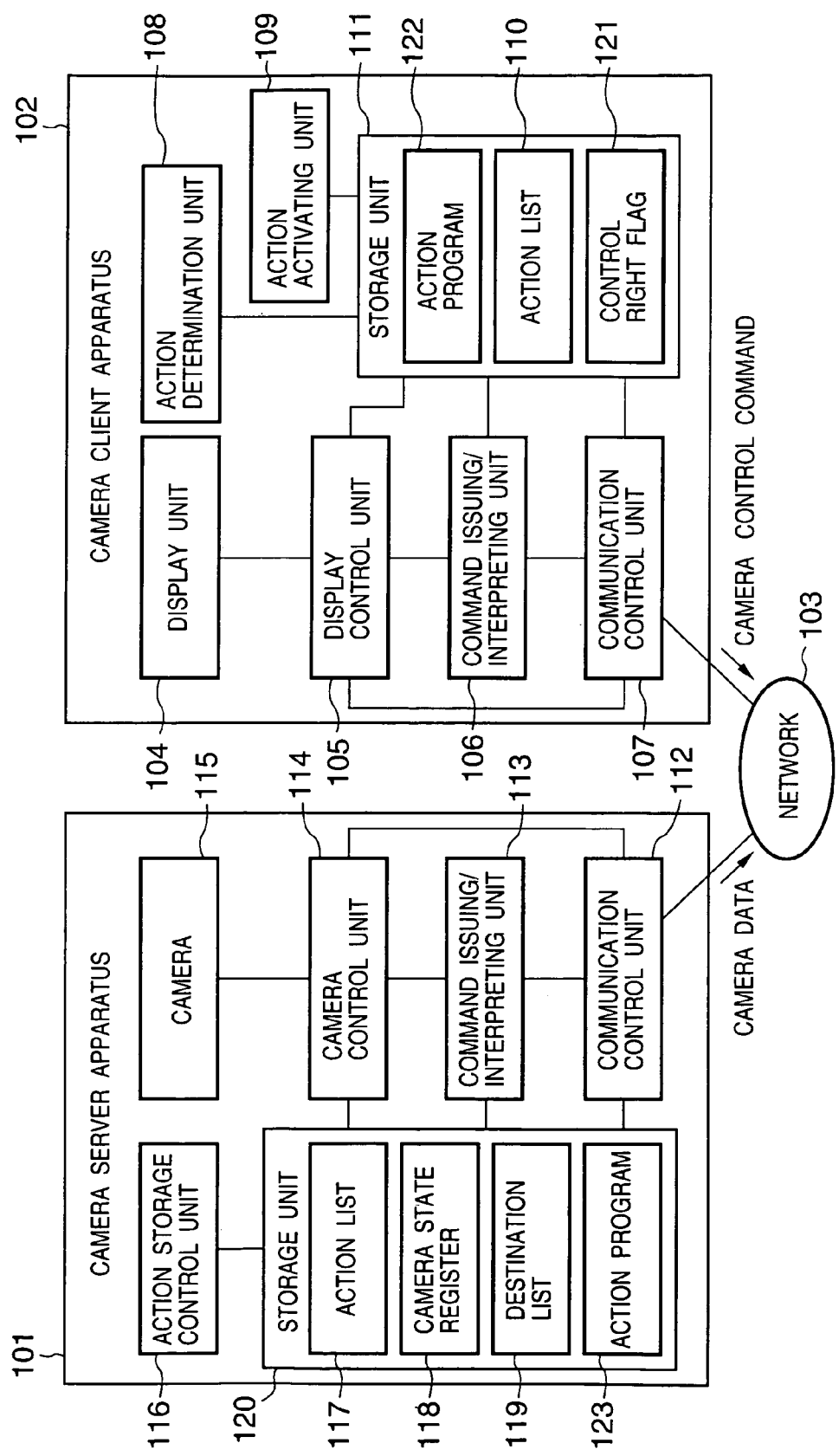
FIG. 1 is a block diagram showing the system configuration of the first embodiment.
Figure 2:
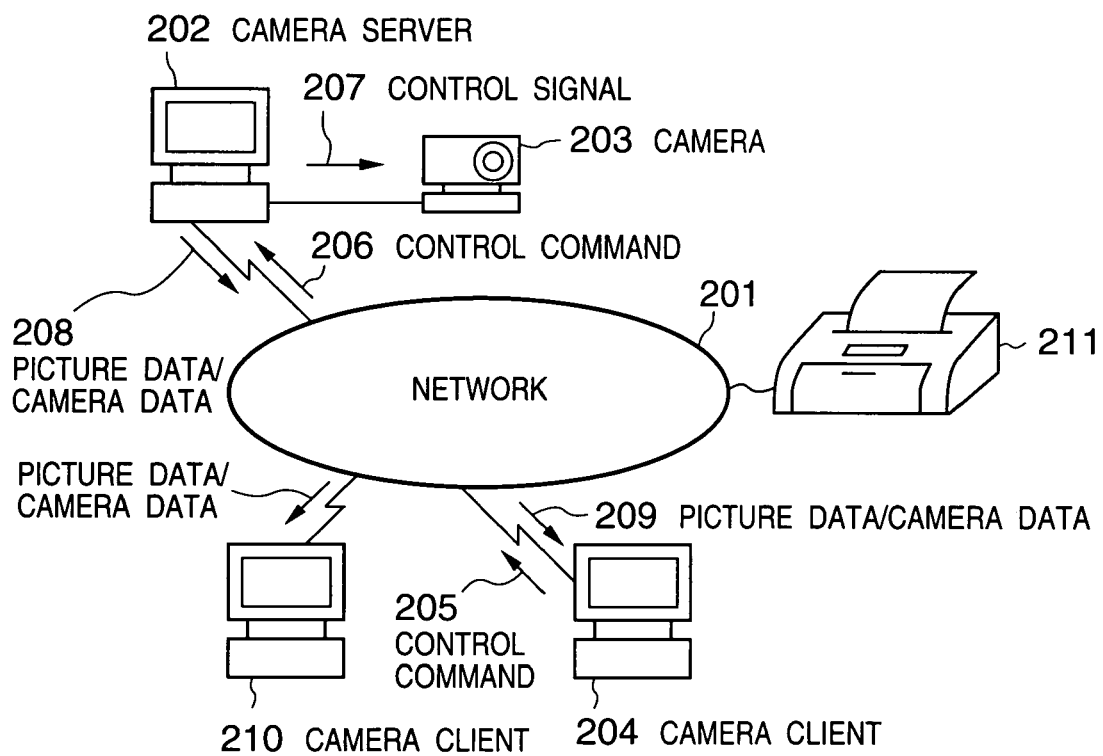
FIG. 2 is a view showing the arrangement of a network in the prior art or the first embodiment.

FIG. 1 shows the arrangement of a camera control system according to the first embodiment. Referring to FIG. 1, reference numeral 101 denotes a camera server apparatus; and 102, a camera client apparatus. These apparatuses are connected to each other through a network 103.

The camera server apparatus 101 will be described.

An action storage control unit 116 stores the angle range (panning, tilt, and zoom ranges) of a camera 115 in a storage unit 120, together with programs for activating actions for the camera as an action list 117.

The following are examples of these actions.

Control on Character Information about Main Object in Image Sensing Range of Camera 115

Figure 17:
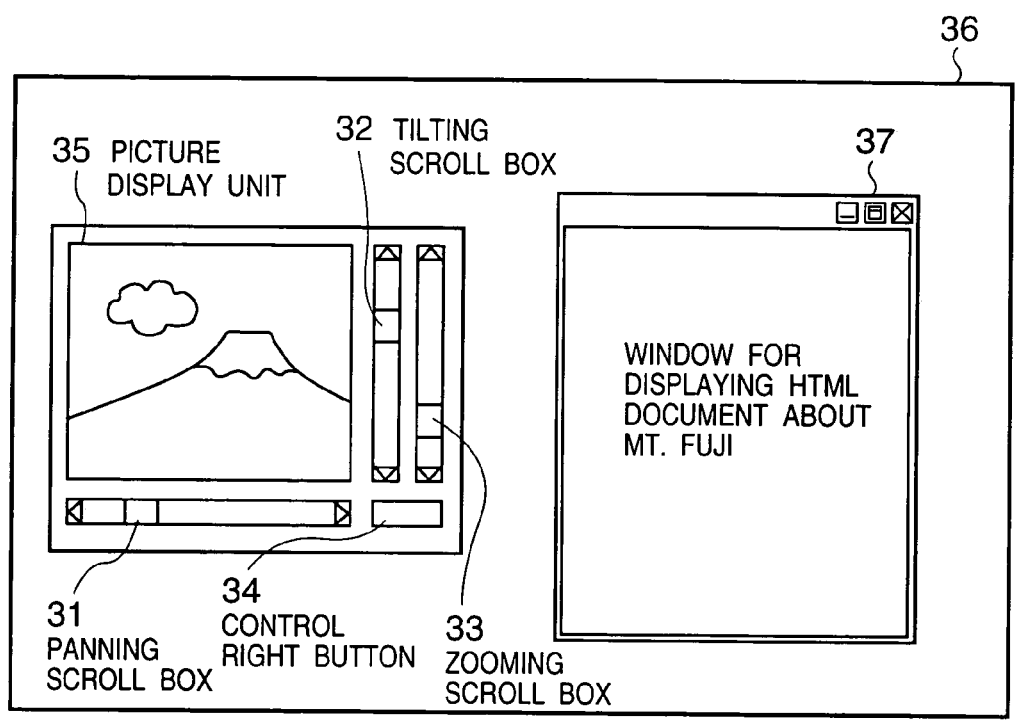
FIG. 17 is a view showing an example of a display screen in the first embodiment.

Assume that panning, tilting, and zooming of the camera 115 are controlled, and Mt Fuji is image-sensed as a main object by the camera 115, as shown in FIG. 17. In this case, a program is activated to make a window 37 pop up in a display screen 36 displayed by a display unit 104, and an HTML document having information about Mt Fuji is displayed on the window 37. Note that not only characters may be displayed, but also a program for displaying images related to Mt Fuji on the window 37 or outputting audio data may be activated.

Operation/Setting of Equipment Connected to Network within Image Sensing Range of Camera 115

Figure 18:
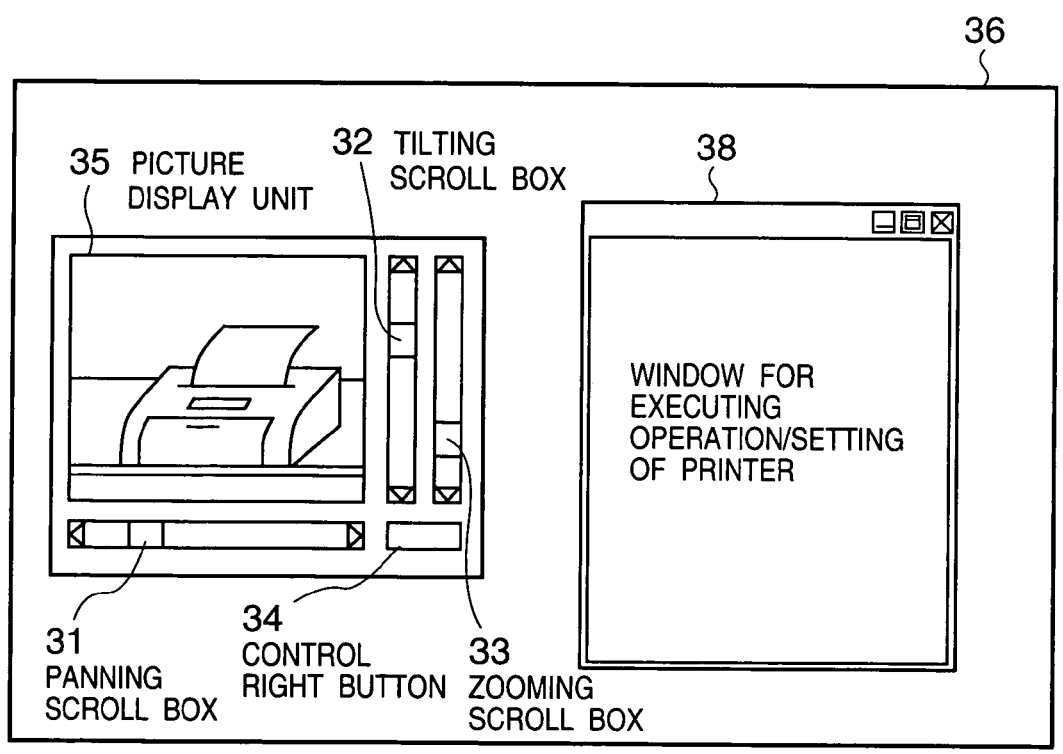
FIG. 18 is a view showing another example of the display screen in the first embodiment.

Assume that panning, tilting, and zooming of the camera 115 are controlled, and a printer 211 connected to a network 201 is image-sensed as a main object by the camera 115, as shown in FIG. 18. In this case, as a program is activated, a window 38 pops up in the display screen 36 of the display unit 104, and the user can operate and set the printer 211 by using the window 37.

Transmission of Mail to Main Object within Image-Sensing Range of Camera 115

Figure 19:
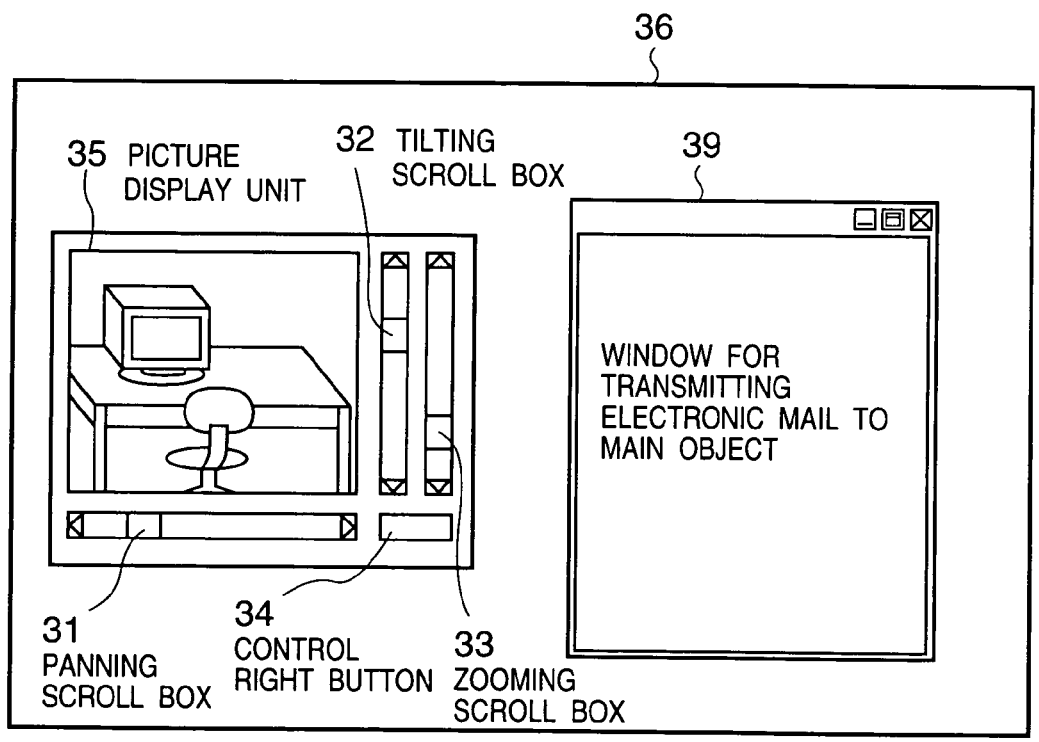
FIG. 19 is a view showing still another example of the display screen in the first embodiment.

Assume that panning, tilting, and zooming of the camera 115 are controlled, and a desk of a given person is image-sensed as a main object by the camera 115, as shown in FIG. 19. In this case, as a program is activated, the window 37 pops up in the display screen 36 of the display unit 104, and a window for generating mail for which the person has already been designated as a destination is displayed on the window 37.

The action list 117 may be stored in, for example, a registry provided by an OS. In this case, the action list 117 is a file expressing a table like the one shown in FIG. 4, and the action storage control unit 116 serves as an editor for writing character strings in the file. An action program 123 stores a plurality of programs for activating actions listed in the action list 117, and can be downloaded into the camera client apparatus 102, as needed.

Figure 4:
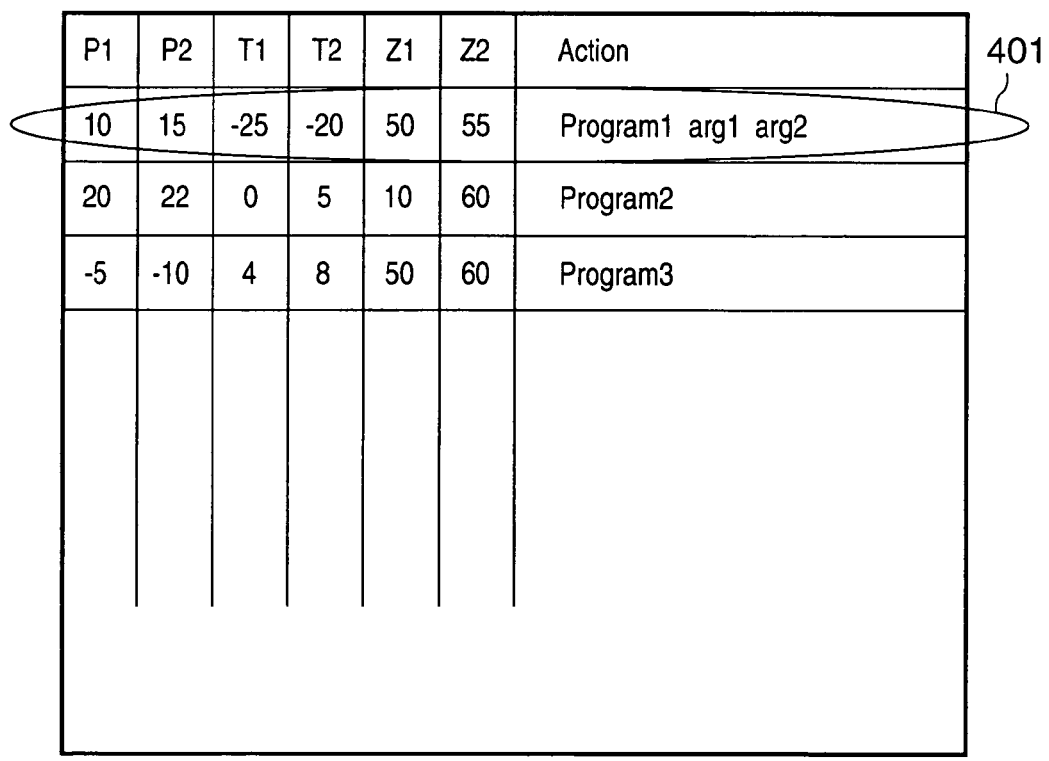
FIG. 4 is a view for explaining an action list.

Referring to FIG. 4, one line represents one action, and P1 and P2 indicate a panning angle range; T1 and T2, a tilt angle range; and Z1 and Z2, a zoom magnification range. Command names and corresponding arguments are written in the "Action" column.

For example, the action indicated by a line 401 indicates that a command named Program1 is activated with arguments arg1 and arg2 being supplied when the panning angle, tilt angle, and zoom magnification (expressed by a field angle in this case) of the camera fall within the range of 10° to 15°, the range of −25° to −20°, and the range of 50° to 55°, respectively.

In practice, the action list 117 may be written in a file format in which the respective items are delimited with tab characters, and a line feed character is entered at the end of description of each action. For example, the file shown in FIG. 5 is such a file.

A camera control unit 114 is connected to the camera 115 through a signal line or the like. The camera control unit 114 can operate the camera 115 by sending a control signal thereto, acquire the current state (panning, tilt, and zoom values, and the like) of the camera 115 therefrom, and store the acquired values in a camera state register 118.

A command issuing/interpreting unit 113 interprets data received from the camera client apparatus 102 and responds to the request (the request to transmit the action list 117, the request to operate the camera 115, or the control right acquisition request). On the contrary, the command issuing/interpreting unit 113 generates camera data to be sent from the camera server apparatus to the camera client apparatus from the action list 117, the camera state register 118, and a destination list 119. Note that the destination list 119 stores information about all clients connected to the camera server apparatus 101, and camera data (camera state change notification) is sent to each camera client apparatus 102 on the basis of the information.

A communication control unit 112 outputs the data generated by the command issuing/interpreting unit 113 to the network 103 and receives data sent from the camera client apparatus 102.

The function of the camera server apparatus 101 has been described above.

The camera client apparatus 102 will be described next.

Figure 3:
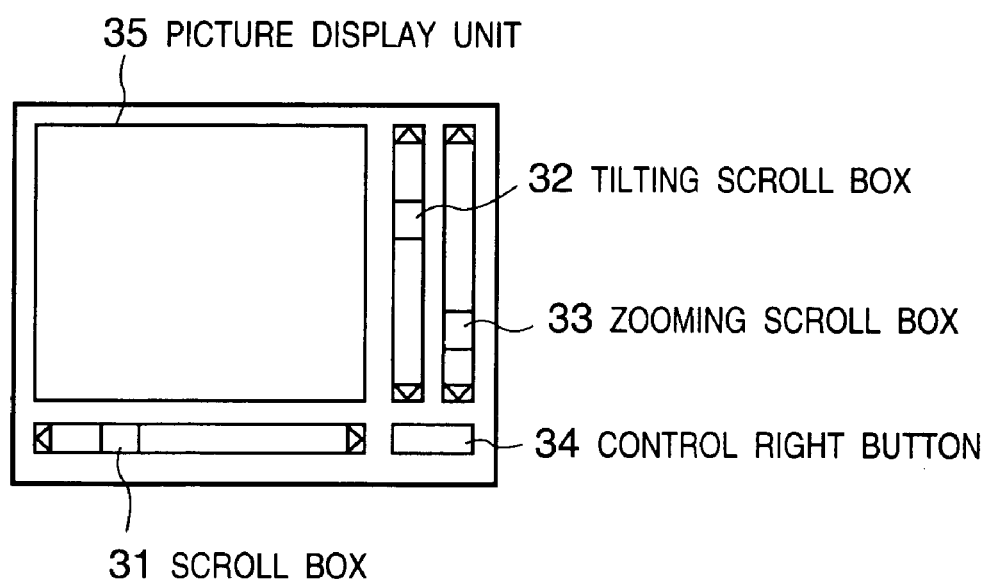
FIG. 3 is a view for explaining a camera client operation screen.

The display unit 104 has a user interface like the one shown in FIG. 3. The display unit 104 can receive a camera operation instruction from the user and display the current state of the camera 115 to notify it to the user. A display control unit 105 controls the screen display and operation described above.

A command issuing/interpreting unit 106 generates a camera control command a camera operation instruction on the display unit 104 which is detected by the display control unit 105, interprets camera data sent from the camera server apparatus 101, and performs corresponding operation (changes the display on the display unit 104 if the received data informs a change in state of the camera 115).

Figure 9:
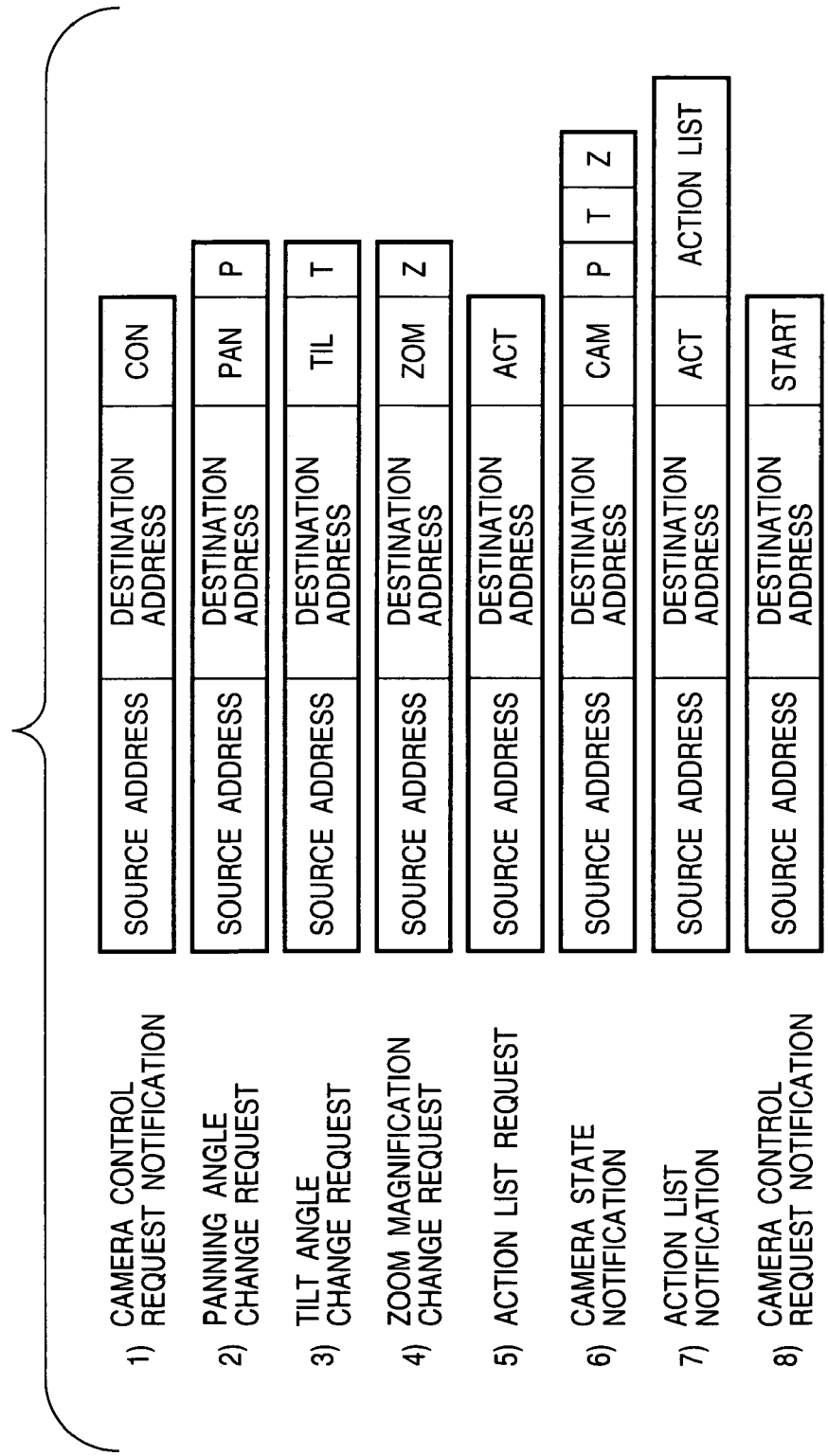
FIG. 9 is a view for explaining camera control command data packets.

If the data sent from the camera server apparatus 101 is an action list (the ID of the command in FIG. 9 is ACT), the contents of the list are stored in an action list 110 in a storage unit 111 of the camera client apparatus 102. An action program 122 stores a program for executing an action activated by an action activating unit (to be described later).

A camera control command and camera data are packets to be output to the network 103, and have a format like the one shown in FIG. 9. Referring to FIG. 9, destination addresses and source addresses are, for example, IP addresses in a TCP/IP network, CON, PAN, TIL, ZOM, CAM, and ACT are the IDs of the respective commands, P, T, and Z in 2) to 4) and 6) are panning, tilt, and zoom values, respectively, and ACTIONLIST in 7) represents the action list 117 in FIG. 1 and is data like the one shown in FIG. 5.

The communication control unit 107 sends a camera control command generated by the command issuing/interpreting unit 106 through the network 103, and receives camera data sent from the camera server apparatus 101 and transfers it to the command issuing/interpreting unit 106.

An action determination unit 108 compares the camera data (indicating the current angle position of the camera) transmitted from the camera server apparatus 101 with the panning, tilt, and zoom ranges written in the action list 110, and checks whether the camera data falls within the panning, tilt, and zoom ranges written in the action list. If they coincide with each other, the action determination unit 108 notifies an action activating unit 109 of the coincidence.

The action activating unit 109 executes a designated action (activating a command).

The function of the camera client apparatus 102 has been described above.

If the camera data transmitted from the camera server apparatus 101 to the camera client apparatus 102 represents a change in state of the camera 115 (the ID of the command in FIG. 9 is CAM), the data is received by the communication control unit 107 and then sent to the display control unit 105. As a consequence, the current state of the camera 115 is displayed on the display unit 104 (this state is reflected in the scroll boxes 32, 33, and 31 in FIG. 3). At this time, the action determination unit 108 checks whether the angle of the camera is at the position designated by the action list 110 to activate an action. If the action needs to be activated, the action activating unit 109 activates the action designated by the action list 110.

Figure 6:
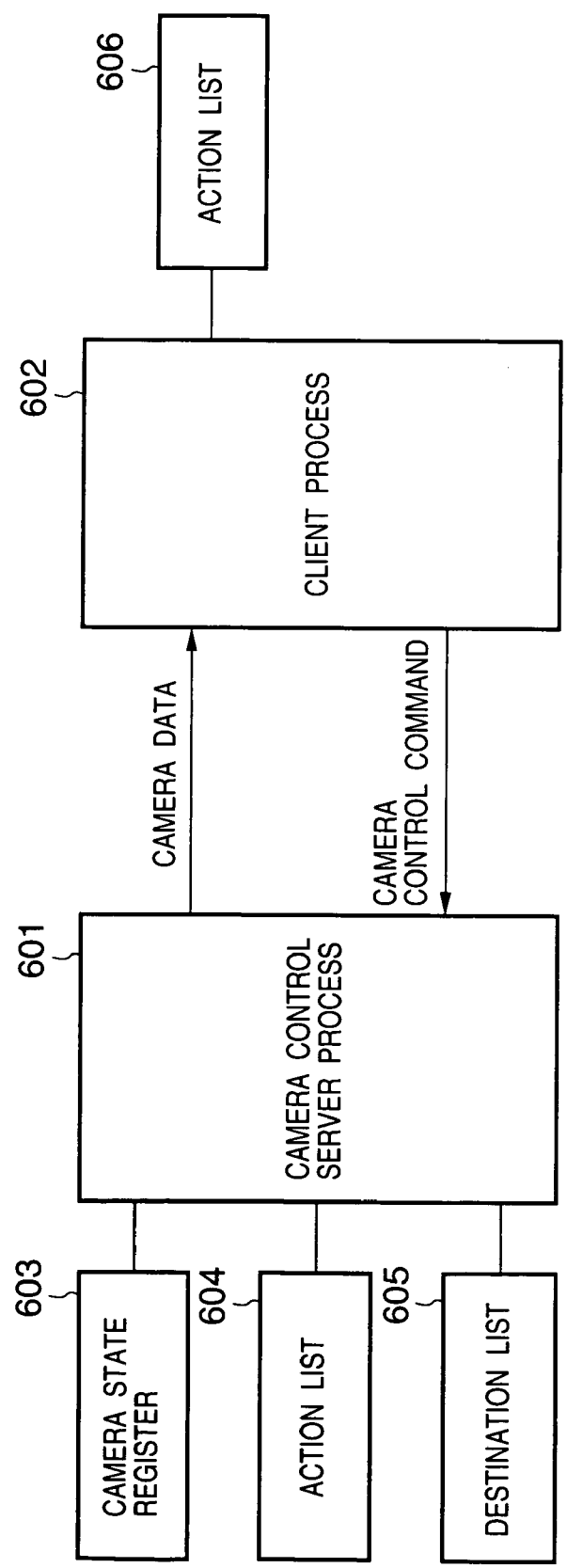
FIG. 6 is a block diagram showing a process arrangement in the first embodiment.

FIG. 6 shows a process arrangement showing the flow of processing in this embodiment. Each item in FIG. 6 will be described below.

Camera Control Server Process 601

The camera control server process 601 receives camera control data issued by a client process 602, and outputs an instruction to the camera control unit to control the camera. In addition, the camera control server process 601 notifies the client process 602 of the state of the camera, e.g., the panning and tilt angles and zoom magnification, and an action list as camera data.

Destination List 605/Camera State Register 603

The destination list 605 and camera state register 603 are shared memories used to exchange data between processes.

Client Process 602

The client process 602 is a process for receiving a picture from the camera server 101 and outputting a camera control request to the camera server 101. This process will be described in detail later with reference to FIG. 8.

Action List 604

The action list 604 is a file like the one shown in FIG. 5.

Figure 7:
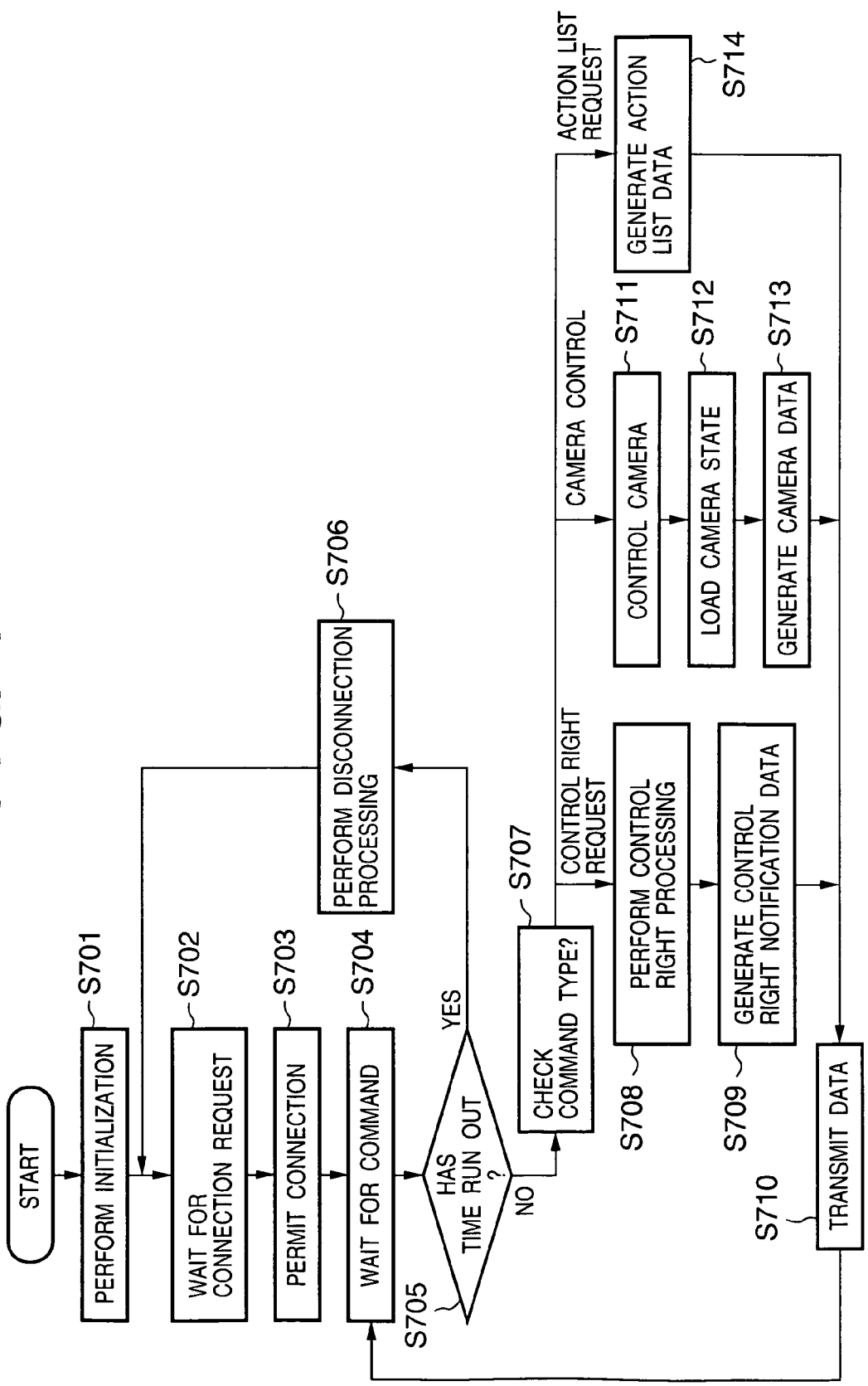
FIG. 7 is a flow chart showing a camera server process in the first embodiment.

FIG. 7 is a flow chart for explaining the camera control server process 601.

When the camera control server process 601 is activated, required initialization processing is performed in step S701. Thereafter, in step S702, the communication control unit (112 in FIG. 1) waits for a control connection request from the client process 602.

When a control connection request command (1) in FIG. 9) is received from the client process 602 in step S703, data for notifying the establishment of control connection is transmitted to the client (by returning data in the same form as that of 1) in FIG. 9).

Subsequently, the flow advances to step S704 to wait for another control command from the client.

When a camera control command is received from the client process 602, it is checked in step S705 whether the controllable time has run out. This processing is performed to prevent a single user from keeping the control right for an excessively long period of time. If a predetermined period has elapsed, disconnection processing is performed in step S706, and the flow returns to step S702.

If the time has not run out yet, the command issuing/interpreting unit 113 interprets the command in step S707, and the flow branches to processing corresponding the command.

If the received command is a control request command (1) in FIG. 9), processing is performed to give the control right to the client in step S708. This processing is also performed in the conventional system described above, and hence a detailed description thereof will be omitted.

The flow further advances to step S709 to generate control right notification data (1) in FIG. 9) for notifying that the control right is given to the client by replacing the source and destination addresses in the control right request command (1) in FIG. 9).

In step S710, this data is transmitted to only the camera client that has requested the control right.

If the received command is a camera control command (2) to 4) in FIG. 9), the camera control unit (113 in FIG. 1) performs camera control in step S711. In step S712, the camera state after the control is written in the camera state register 603.

In step S713, the command issuing/interpreting unit 113 in FIG. 1 generates camera data (6) in FIG. 9) from the data stored in the destination list 605 and camera state register 603. To notify a plurality of camera clients of the camera data, camera data having client addresses as destination addresses in FIG. 9 are generated by the same number as that of clients.

In step S710, the communication control unit (112 in FIG. 1) transmits the camera data to all the camera clients.

If it is determined in step S707 that the command is an action list request (5) in FIG. 9), action list notification data (7) in FIG. 9) is generated from the action list 604 and the source address in the action list request command (5) in FIG. 9). In step S710, the action list data is transmitted to the camera client that has generated the request.

The flow of processing in the camera server 101 has been described above.

Figure 8:
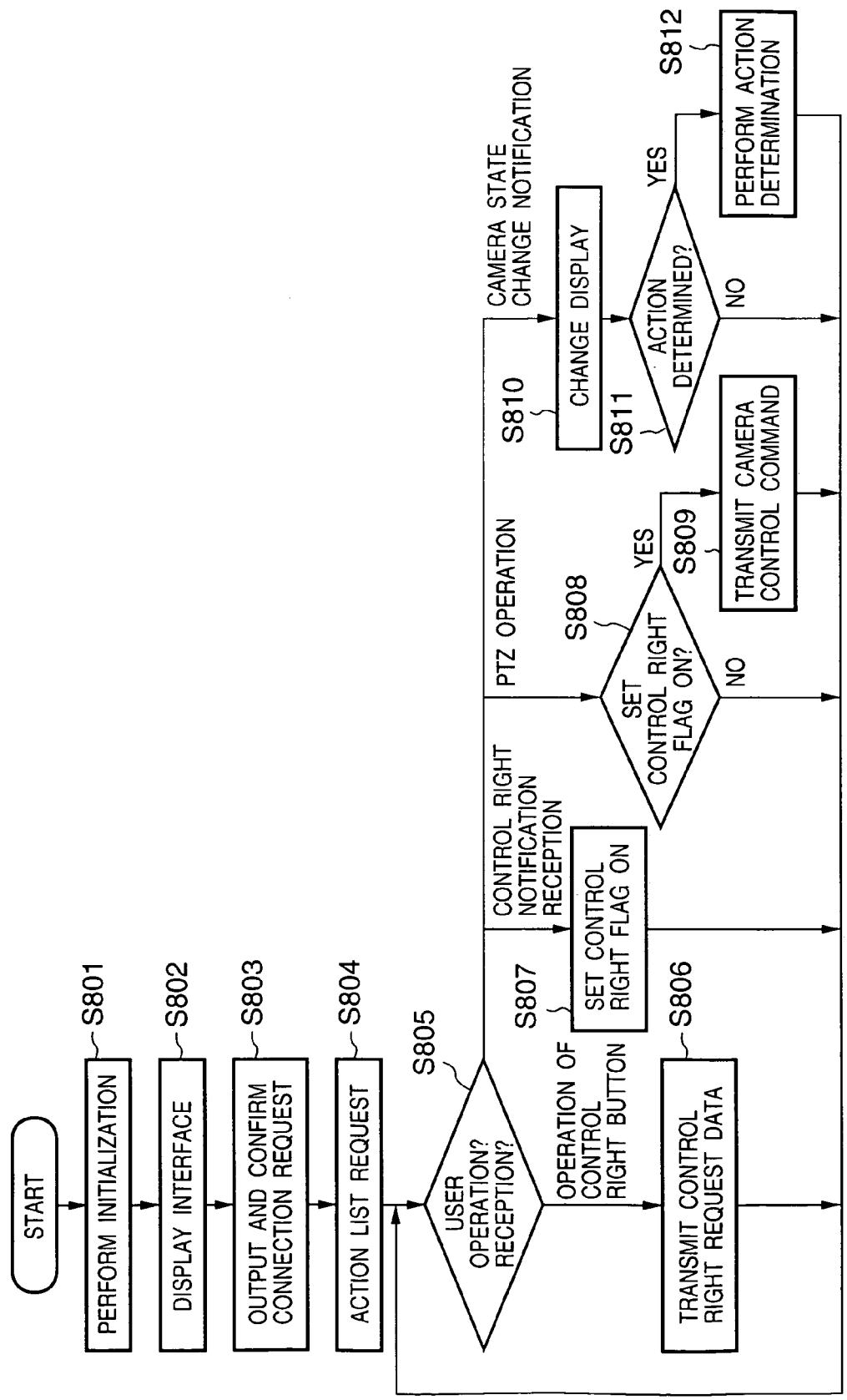
FIG. 8 is a flow chart showing a camera client process in the first embodiment.

The flow of processing in the camera client apparatus 102 will be described next with reference to FIG. 8.

When the client process 602 is activated, required initialization (e.g., turning off the control right flag) is performed in step S801. In step S802, a user interface like the one shown in FIG. 3 is displayed on the display unit 104.

In step S803, a connection request is output to the camera server 101, and connection permission from the server is confirmed.

In step S804, an action list request is output by transmitting data indicated by 5) in FIG. 9 to the camera server 101. The camera client stores the action list in the action list 110 in FIG. 1 by causing the command issuing/interpreting unit (106 in FIG. 1) to interpret the action list notification data (7) in FIG. 9) returned from the server.

The flow then advances to step S805 to wait for operation by the user and data from the camera server 101.

If it is determined in step S805 that the user has pressed the control right acquisition button, the flow advances to step S806 to generate a control right request command (1) in FIG. 9) by using the command issuing/interpreting unit (106 in FIG. 1) and transmit the command to the camera server 101 by using the communication control unit (107 in FIG. 1). The flow returns to step S805.

If it is determined in step S805 that a control right notification is received from the camera server 101 (8) in FIG. 9), the flow advances to step S807 to turned on the control right flag (121 in FIG. 1). The flow then returns to step S805.

If the user performs panning, tilting, and zooming operations in step S805, the flow advances to step S808 to check the control right flag (121 in FIG. 1). If the flag is ON, a camera control command (2) to 4) in FIG. 9) is generated by using the command issuing/interpreting unit (106 in FIG. 1). This command is transmitted to the camera server 101 by using the communication control unit (107 in FIG. 1). The flow then returns to step S805.

If it is determined in step S805 that a camera state notification (6) in FIG. 9) is received from the camera server 101, the flow advances to step S810 to change the display of the display terminal apparatus. In step S811, the action determination unit 108 performs action determination. This processing will be descried later.

If it is determined that the angle position of the camera is at a position where an action should be activated, the action activating unit 109 activates a designated action in step S812. The action activating unit 109 will be described later. Thereafter, the flow returns to step S805.

The following is the flow of processing in the camera client apparatus.

The action determination unit 108 will be described next.

Figure 10:
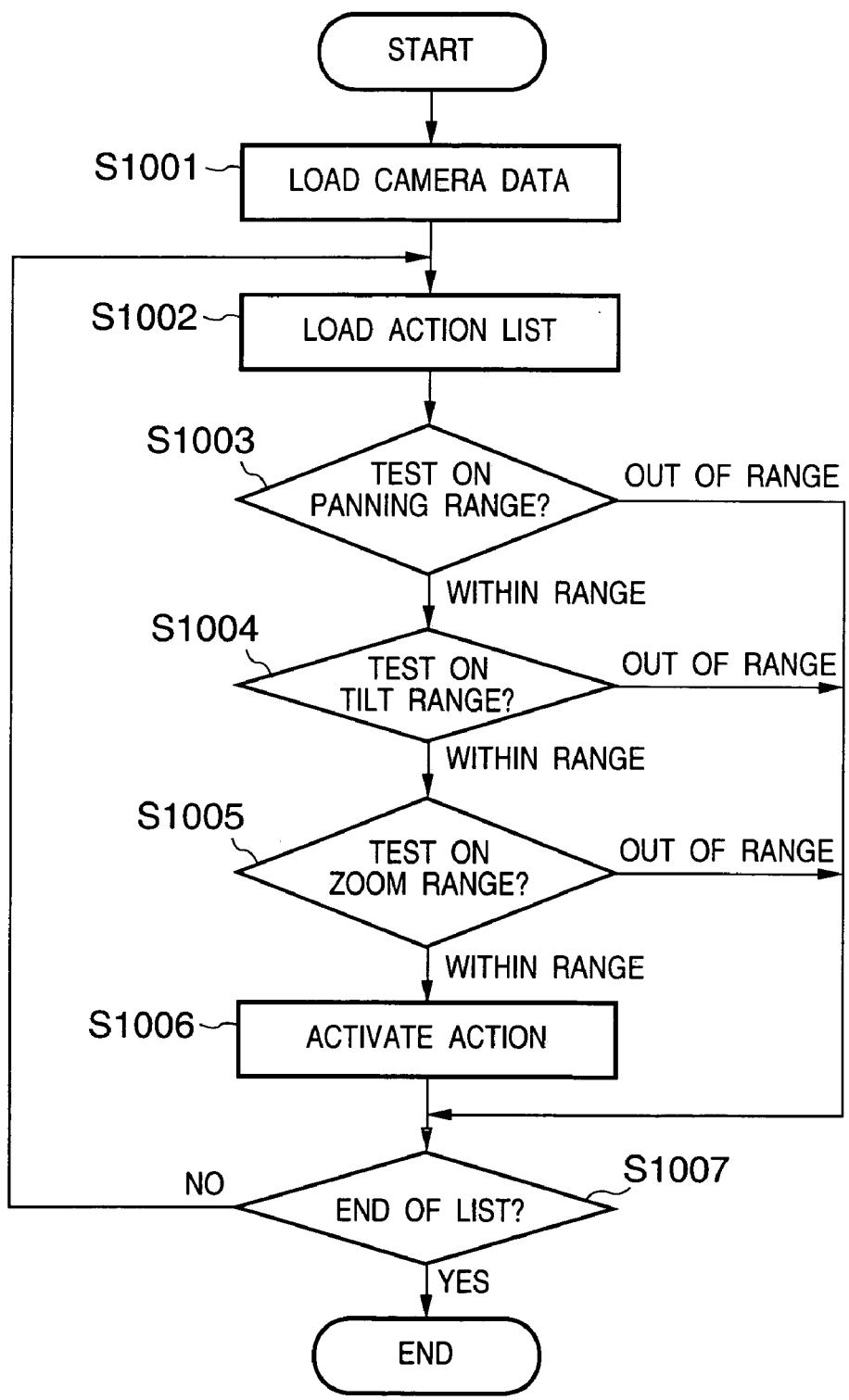
FIG. 10 is a flow chart showing a procedure in an action determination unit.

FIG. 10 is a flow chart showing a procedure in the action determination unit 108.

In step S1001, the action determination unit 108 loads panning, tilt, and zoom values in camera data notified from the camera server 101.

In step S1002, the action determination unit 108 loads one line from the action list 110, and loads data corresponding to the items of P1, P2, T1, T2, Z1, and Z2 in FIG. 4.

In step S1003 and subsequent steps, the action determination unit 108 checks whether the panning, tilt, and zoom values fall within the designated ranges, respectively. Consider, for example, the panning value. The action determination unit 108 checks whether the panning value in the camera data notified from the camera server falls within the range between P1 and P2 written in one line of the action list loaded in step S1002.

If it is determined in step S1003 and the subsequent steps that all the panning, tilt, and zoom values fall within the ranges, the action determination unit 108 transfers the items in the "Action" column in the action list (see FIG. 4) to the action activating unit 109 and delegates the processing thereto.

In step S1007, it is checked whether all the lines of the action list are determined. If NO in step S1007, the flow returns to step S1002. If YES in step S1007, the processing is terminated.

The operation of the action determination unit 108 has been described above.

The action activating unit 109 will be described next.

The action activating unit 109 activates a command in accordance with a command name written in an action list and an argument corresponding to the command.

Figure 11:
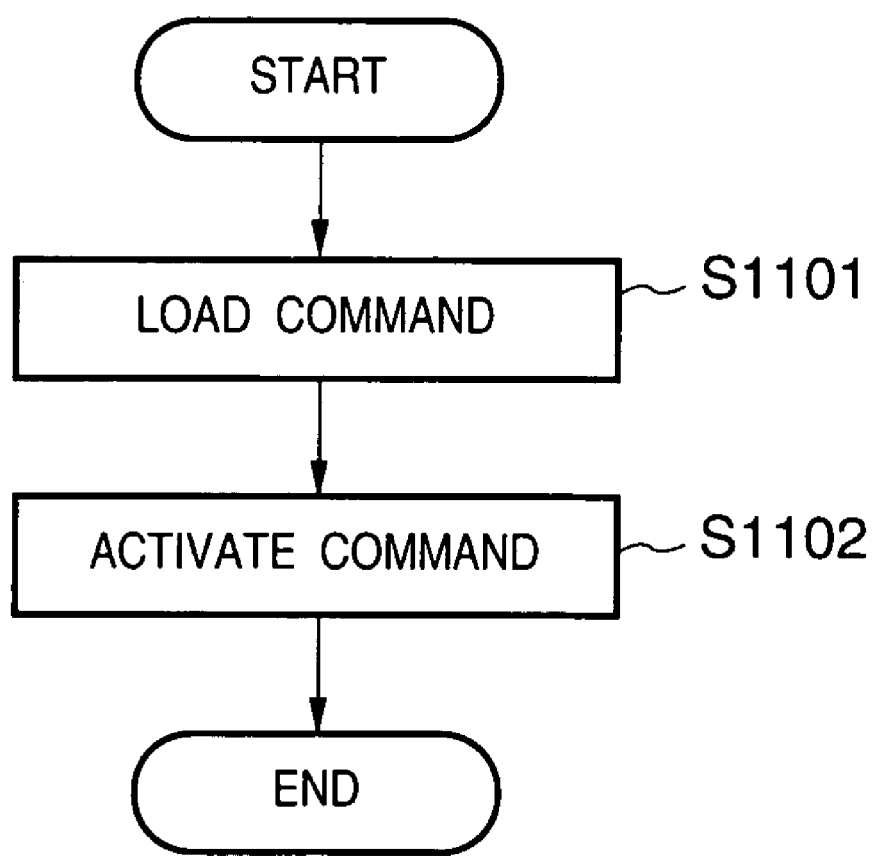
FIG. 11 is a flow chart showing a procedure in an action activating unit.

FIG. 11 is a flow chart for explaining the action activating unit 109.

In step S1101, the action activating unit 109 loads a command transferred from the action determination unit 108. This command is written in the action list and corresponds to an item in the "Action" column.

In step S1102, the action activating unit 109 activates the command. The operating system has the function of activating an executable file (program) in a file system by designating a command name and argument. This function corresponds to "exec system call" in the Unix operating system, and operating systems such as Windows 95 and Windows NT (tradenames) have the same function. Instep S1102, the command is executed by using such a method. At this time, the camera client apparatus 102 sends, to the camera server 101, a request to download a program for activating the action having undergone the action determination processing from the action program 123. The command is executed on the basis of the downloaded program. Note that all programs stored in this action program 123 may be stored beforehand in the action program 122 on the camera client apparatus 102 side concurrently with the transmission of action list data (step S710 in FIG. 7), and a command may be executed by selecting a program from a plurality of stored programs. Furthermore, the corresponding program may have already existed in the action program 122.

The operation of the action activating unit 109 has been described above.

As described above, according to this embodiment, an action designated by the camera server apparatus in advance can be activated on the camera client by operating the camera and changing its angle. That is, since a program for operating an action is activated after the camera 115 is controlled within a predetermined image sensing range, operation burden of the action activating unit 109 is reduced.

Second Embodiment

The second embodiment will be described below.

Figure 12:
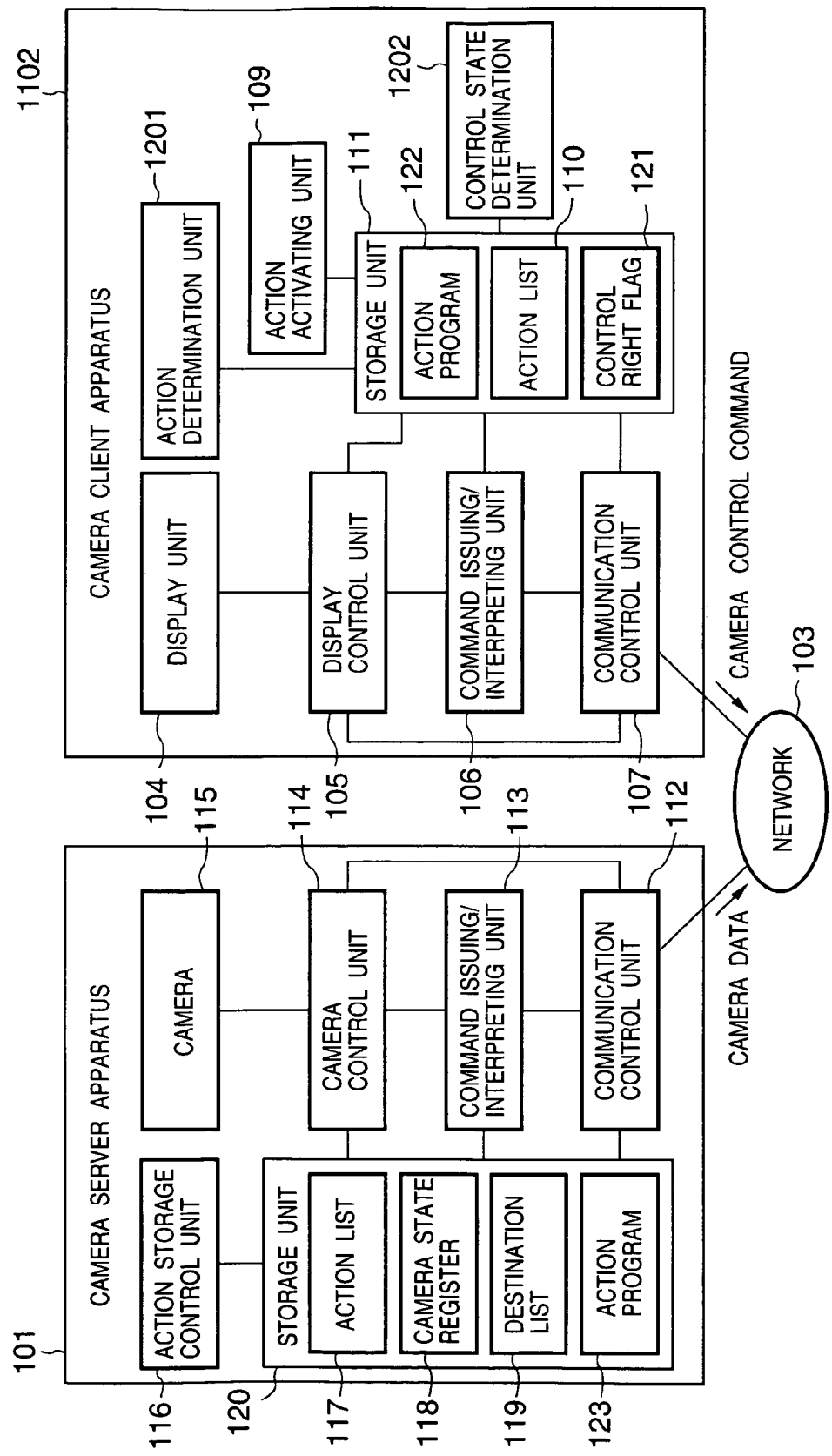
FIG. 12 is a block diagram showing the system configuration of the second embodiment.

FIG. 12 shows the arrangement of the second embodiment. The arrangement of the second embodiment differs from that of the first embodiment in FIG. 1 in that a control state determination unit 1202 is added, and an action determination unit 1201 is obtained by modifying the action determination unit 108 in the first embodiment. The arrangement of the remaining portion is the same as that of the first embodiment described with reference to FIG. 1, and hence a description thereof will be omitted.

Figure 13:
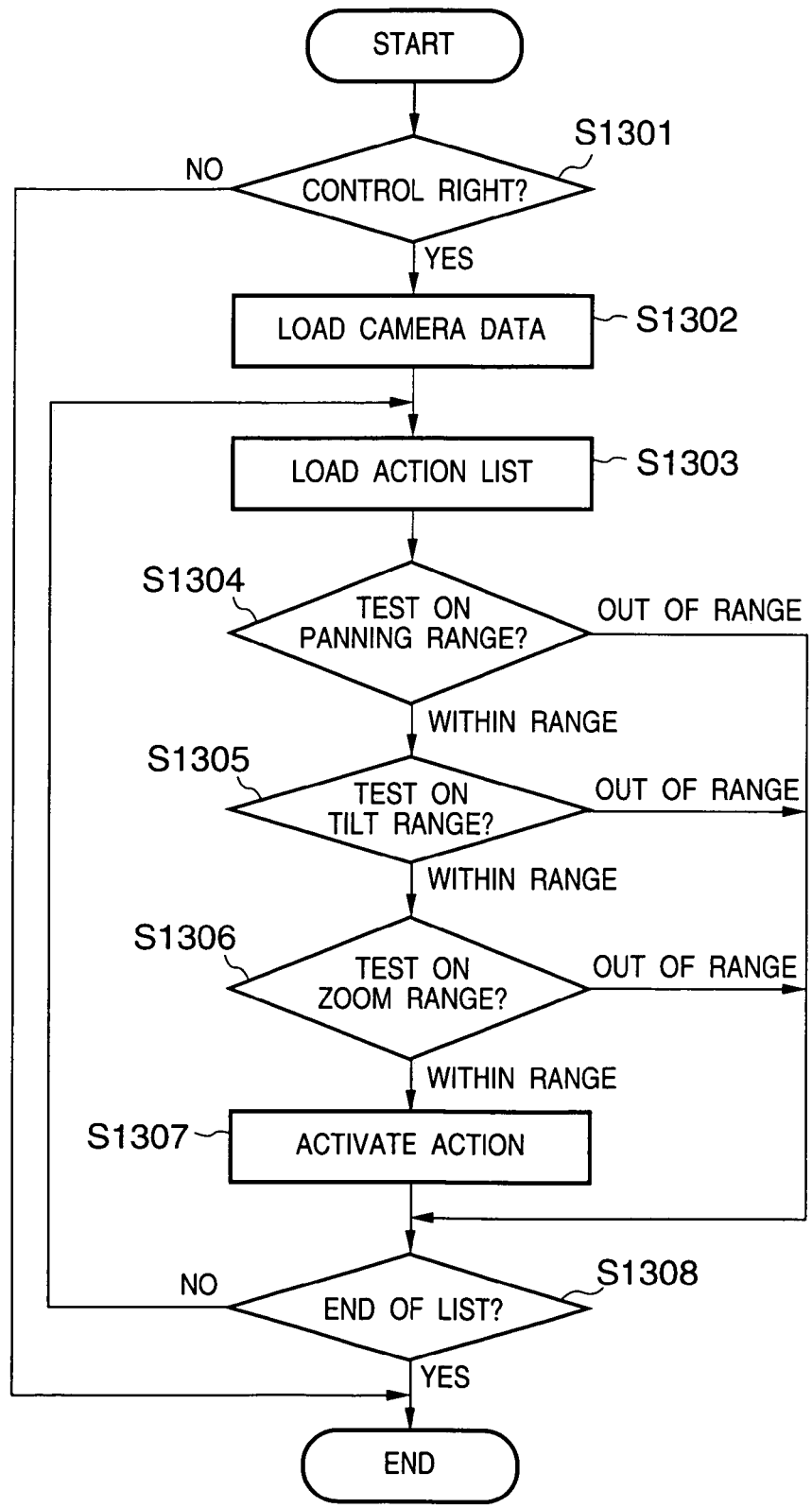
FIG. 13 is a flow chart showing a procedure in an action determination unit.

FIG. 13 is a flow chart showing a procedure in the action determination unit 1201 according to this embodiment. This flow chart is identical to that shown in FIG. 10 except for the addition of step S1301.

In step S1301, the control state determination unit 1202 checks whether the camera client currently has the control right to the camera 115. If NO in step S1301, the processing is immediately terminated (no action is activated). Only if the camera client has the control right to the camera 115, it is checked whether an action is activated.

The control state determination unit 1202 checks whether the user has the control right to the camera 115. More specifically, the control state determination unit 1202 checks a control right flag 121.

Figure 14:
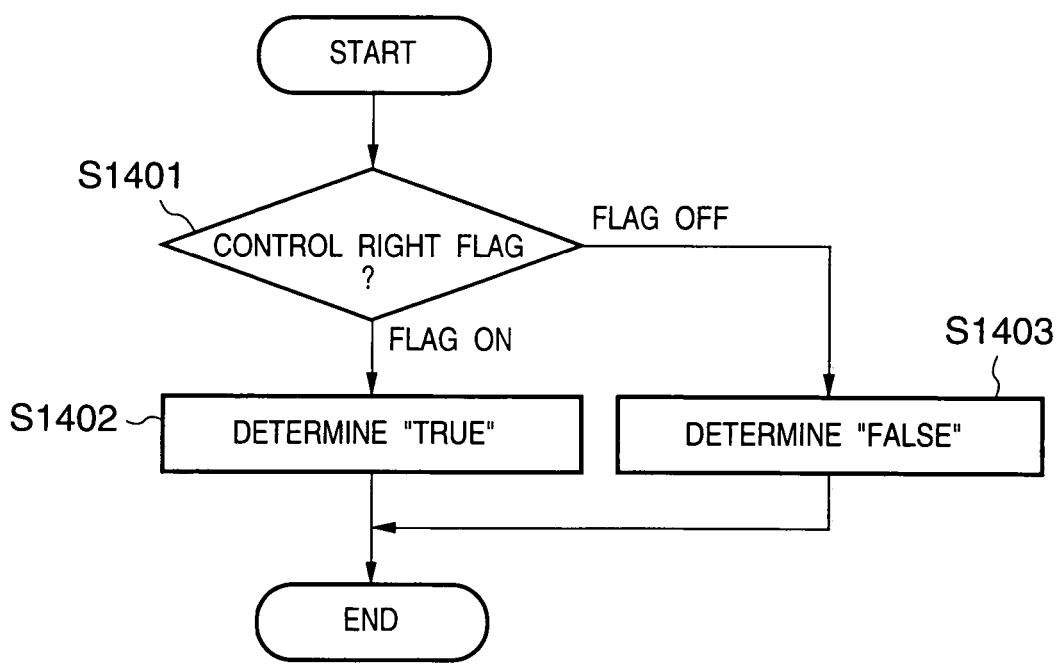
FIG. 14 is a flow chart showing a procedure in a control state determination unit.

FIG. 14 is a flow chart showing a procedure in the control state determination unit 1202.

In step S1401, the control state determination unit 1202 checks the state of the control right flag 121. If the flag is ON, the control state determination unit 1202 determines "true" in step S1402. If the flag is OFF, the control state determination unit 1202 determines "false" in step S1403. The processing is then terminated.

With the arrangement of this embodiment, a specific action having significance for only a user having the control right to a camera 115 can be executed on only the client having the control right to the camera 115 without being activated on any client that does not have the control right to the camera 115. If, for example, an action such as a printer setting/operation like the one shown in FIG. 18 is executed on a plurality of client apparatuses at once, a problem arises. Such a problem can be solved by making only the client having the control right to the camera 115 to execute an action such as equipment setting/operation.

In addition, in activating mail software like the one shown in FIG. 19, since the probability that clients who do not have the right control of the camera 115 want to transmit electronic mail to a main object is low, the program is preferably activated only on the client having the control right.

Furthermore, a flag indicating that the action is to be activated only when information indicating that the corresponding client has the control right is written in the action list, or a flag indicating that the action is to be activated even without the control right may be added, thereby changing the contents of actions to be activated depending on whether a given client has the control right or not. By identifying the flag added in this manner, for example, in displaying information about a main object with an HTML document like the one shown in FIG. 17, the corresponding action is activated with respect to all clients which are accessing the camera server 202 regardless of whether the clients have the right control of the camera 115. On the other hand, for example, the above action for activating printer setting/operation shown in FIG. 18, an action for activating mail software, or the like is activated for only the client having the control right to the camera 115. In this manner, actions can be activated suitably for the respective clients.

Third Embodiment

The third embodiment will be described below.

In this embodiment, the action list in the first embodiment shown in FIG. 5 additionally includes a flag for determining whether to end an action in a case wherein the camera 115 is controlled during operation of the action by a given program, and the image sensing range has fallen outside the activation range of the action.

The arrangement of this embodiment is the same as that shown in FIG. 1 except that the action list 110 in FIG. 1 additionally includes a flag for determining whether to end an action in a case wherein the image sensing range has fallen outside the activation range of the action, and hence a description thereof will be omitted.

Figure 20:
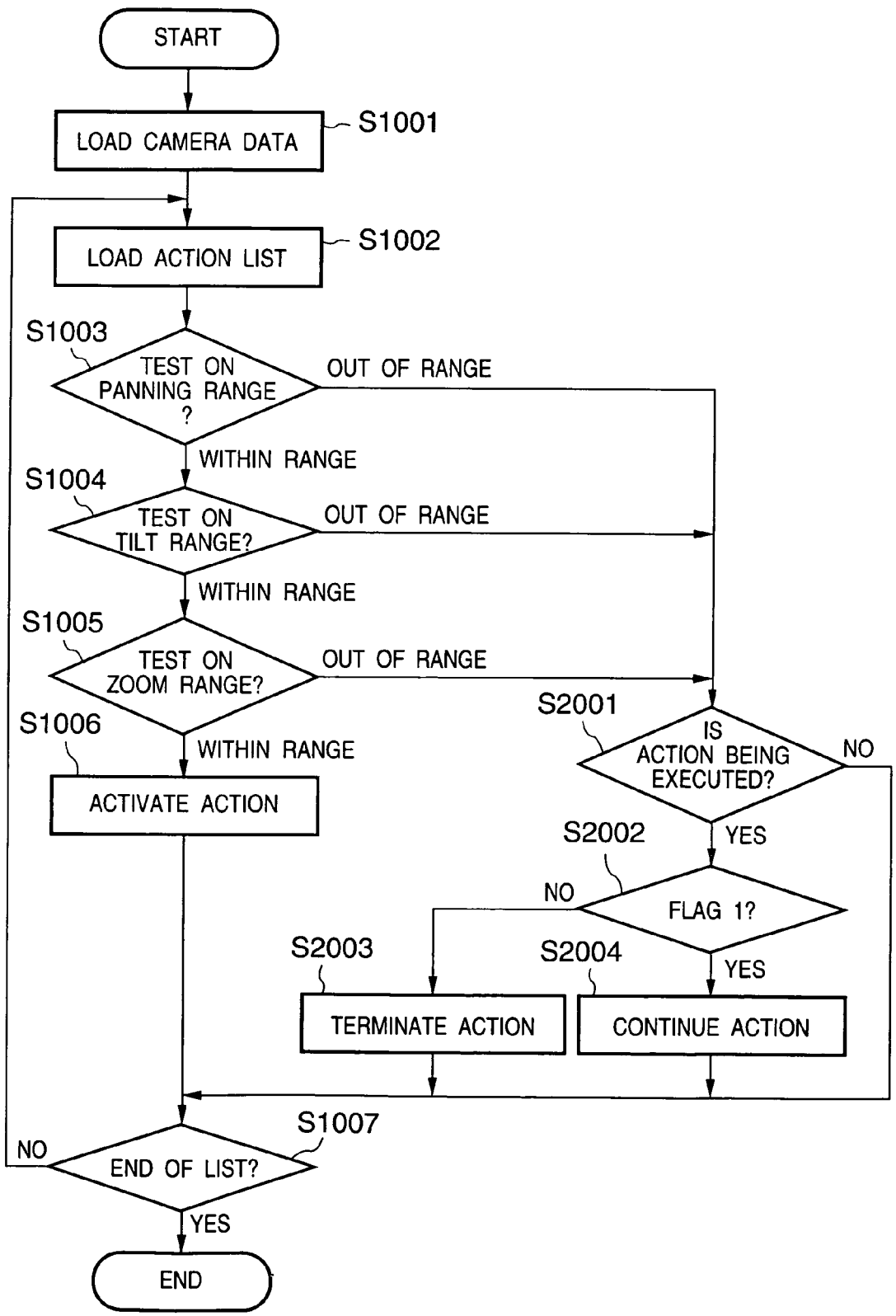
FIG. 20 is a flow chart showing a procedure in an action determination unit.

FIG. 20 is a flow chart showing a procedure in an action determination unit 108 in this embodiment. The flow chart of FIG. 20 is identical to that of FIG. 10 except that processing in steps S2001 to S2004 is added.

If parameters, i.e., the panning, tilt, and zoom values of a camera 115, fall outside the activation operation range of a predetermined action (program), it is checked in step S2001 whether the action as the current target is being activated. If NO in step S2001, the flow advances to step S1007. If YES in step S2001, the flow advances to step S2002.

In step S2002, the action determination unit 108 checks the flag indicating whether the target action is ended or not. If the flag is "1", the flow advances to step S2004. If the flag is "0", the flow advances to step S2003.

In this embodiment, if this flag is "1", the operation is kept performed even if the above parameters fall outside the activation range of the action. If the flag is "0", the operation is terminated. As an action for which flag "1" is added, the printer setting/operation shown in FIG. 18 or the activation of electronic mail software shown in FIG. 19 is conceivable. These actions (programs) are preferably kept performed unless a corresponding instruction is received from the user even if the image sensing range is changed. As an action for which flag "0" is added, the display of character information about the image sensing range shown in FIG. 17 is conceivable. If the image sensing range of the camera 115 changes, an object does not correspond to the displayed character information. Therefore, this action is preferably changed.

In step S2003, the end of the target action under operation is designated. In step S2004, the continuation of the target action under operation is designated.

According to the above embodiment, when the image sensing range changes, whether to continue the operation of each action can be controlled depending on each action. This makes it possible to appropriately control each action.

Fourth Embodiment

The fourth embodiment will be described below.

Figure 15:
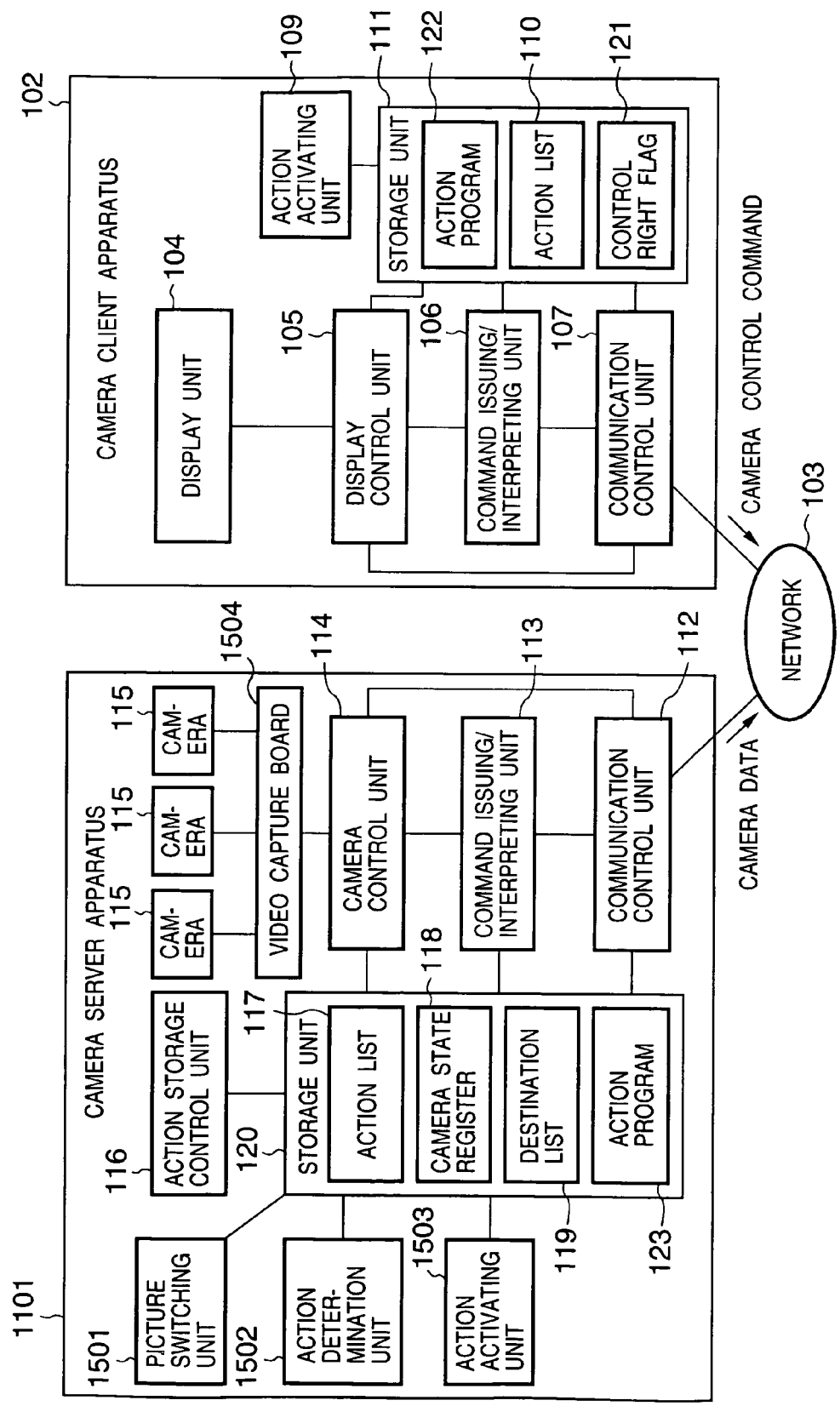
FIG. 15 is a block diagram showing the arrangement of the fourth embodiment.

FIG. 15 shows the arrangement of the fourth embodiment. This arrangement is obtained by adding a picture switching unit 1501 to the camera server apparatus in the first embodiment shown in FIG. 1, and an action determination unit 1502, which is installed on the camera client apparatus side in the first embodiment is also installed on the camera server apparatus 1101 side. Since the arrangement of the remaining portion is the same as that in the first embodiment, a description thereof will be omitted.

The picture switching unit 1501 is a technique that has already been accomplished in the prior art. The picture switching unit 1501 can connect and switch a plurality of cameras by using the input switching function or the like of a video capture board 1504 (capable of receiving a plurality of video inputs) in the camera server apparatus.

An action activating unit 1503 is identical to the one described in the first embodiment.

The action determination unit 1502 is similar to the action determination unit 108 described in the first embodiment. However, the difference between these units will be described.

Figure 16:
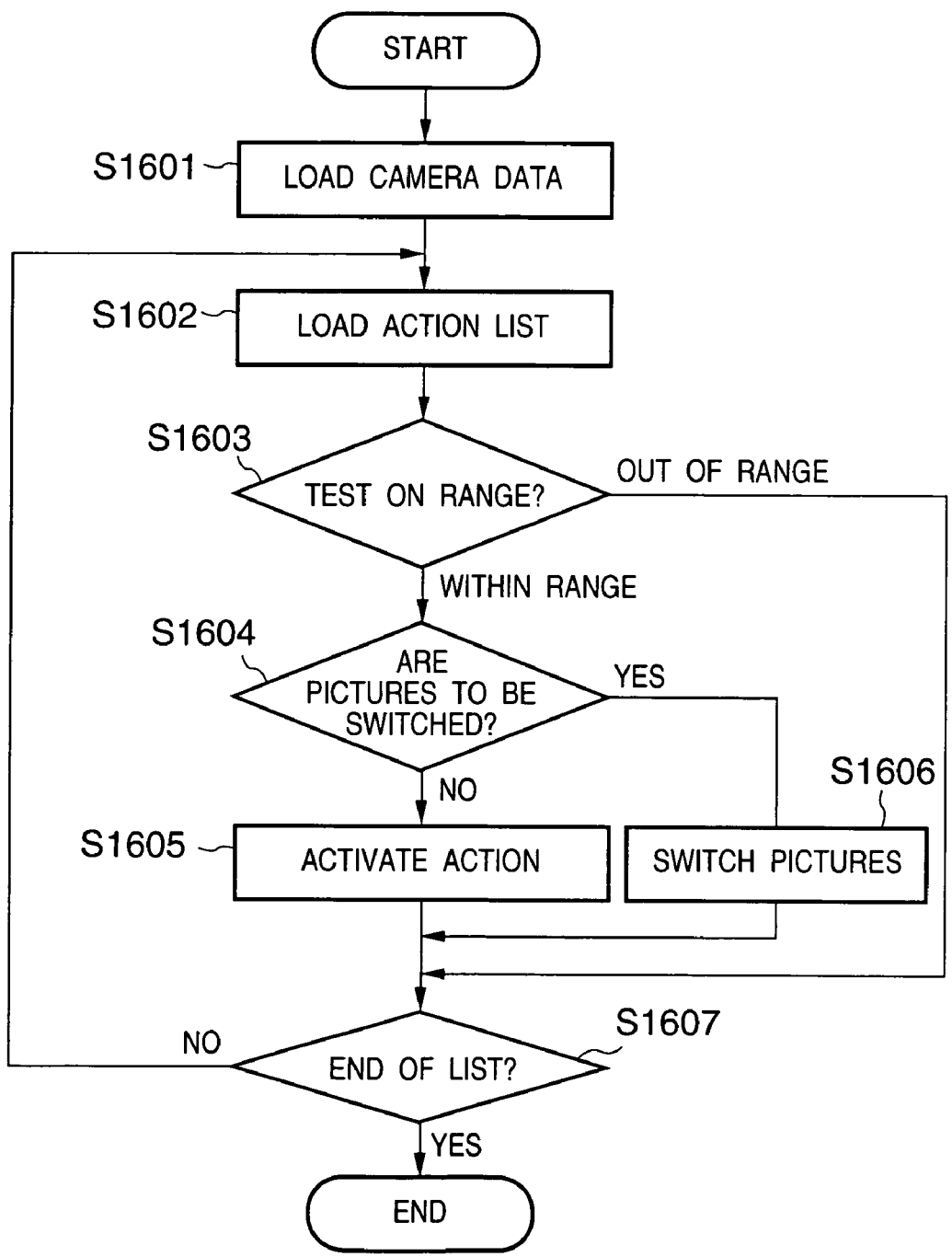
FIG. 16 is a flow chart showing a procedure in an action determination unit.

FIG. 16 is a flow chart showing a procedure in the action determination unit 1502 in this embodiment.

Steps S1601 to S1603 are the same as steps S1001 to S1005 in FIG. 10.

Instep S1604, it is checked whether a command written in the "Action" column of an action list is a picture switching action. Assume that a character string "VIDEOCHANGE" is written in the "Action" column (in which command names are basically written) of a picture switching action. In this case, this character sting is checked.

If the command is a picture switching action, the flow advances to step S1606 to switch pictures by using the picture switching unit 1501.

If the command is not a picture switching action, the flow advances to step S1605 to activate the action by using the action activating unit 1503 (on the server). For example, data such as character information corresponding to the current image sensing range is output to a client 102 on the basis of the activated action. Note that data such as character information may be output to not only the client 102 (i.e., a client which is receiving a picture obtained a camera 115 from the camera server 101) which is operating the camera but also the client 102 which is currently connected to a camera server 101.

With the above arrangement, when, for example, the camera is operated up to the panning angle limit, the current picture can be switched to a picture taken by another camera angled for a portion which cannot be image-sensed by the above camera.

Note that if both a server and a client have action activating means as in this embodiment, actions can be selectively activated by providing the respective actions with flags each indicating that the corresponding action is effective only on the server or client.

Consider, for example, an action for displaying character information corresponding to the current image sensing range of the camera 115. If a flag for activating this action is prepared on the camera server apparatus 101 side, the action determination unit 1502 determines the use of the action activating unit 1503 on the camera server 101 side. As a consequence, the action activating unit 1503 activates a program (stored in the action program 123) for executing the action. Character information output on the basis of the execution of the action may be output to the client 102 to be displayed. With this arrangement, the transmission capacity required on the network can be reduced.

In addition, consider an action for executing operation/setting of equipment existing in the current image sensing range of the camera 115. In this case, if a flag for activating the action is prepared on the client 102 side, the action determination unit 1502 determines the use of the action activating unit 109 on the client 102. As a consequence, the action activating unit 109 activates a program (stored in the action program 122) for executing the action. The execution program used in this case is downloaded from the camera server 101 when the action determination unit 1502 determines the use of the action activating unit 109, or may be downloaded in advance on the client 102 side.

Note that the arrangement of the second embodiment may be applied to the fourth embodiment. In this case, the camera server 101 may cause only the client 102 having the control right to download a program for executing a predetermined action. The client 102 having the control right can execute the action in accordance with the downloaded program.

The objects of the above-mentioned embodiments are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus. In this case, the program code itself read out from the storage medium realizes the functions of the above-mentioned embodiments, and the storage medium which stores the program code constitutes the present invention. The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

When the present invention is to be applied to the above storage medium, program codes corresponding to the flow charts described above (shown in FIGS. 7, 8, 10, 11, 13, 14, and 16) are stored in the storage medium.

As has been described above, according to the present invention, a specific predetermined action can be operated in accordance with the angle position of the camera.

As many apparently widely different embodiments of the present invention can be made without departing from the spirit and scope thereof, it is to be understood that the invention is not limited to the specific embodiments thereof except as defined in the appended claims.

What is claimed is:

1. An information control apparatus for controlling an image sensing range of a camera by a remote user connected via a communication network, comprising:
    a storage device adapted to store a program for operating a predetermined action associated with the image sensing range of the camera;
    an acquisition device adapted to acquire information about a current image sensing range of the camera; and
    a control device adapted to automatically activate the program stored in said storage device when the current image sensing range of the camera acquired by said acquisition device matches with the image sensing range of the camera associated with the predetermined action,
    wherein the predetermined action is configured to enable the user to actively control an object within the current image sensing range of the camera.

2. The apparatus according to claim 1, wherein said apparatus further comprises detection means for detecting whether a user has a control right to the camera, and said control means activates the program stored in said storage means when said detection means detects that the user has the control right to the camera.

3. The apparatus according to claim 1, wherein said apparatus further comprises detection means for detecting whether the user has a control right to the camera, said storage means stores programs for operating a plurality of different actions, and said control means activates an action upon determining whether the action is an action to be activated while the user has the control right to the camera or an action to be activated even if the user does not have the control right to the camera.

4. The apparatus according to claim 1, wherein said storage device stores programs for operating a plurality of different actions, and said control device performs control upon determining termination/continuation of operation of a program under activation in accordance with a type of action under activation when said acquisition device detects a change in the image sensing range of the camera in the presence of the program under activation.

5. The apparatus according to claim 1, wherein said storage device stores a program for operating an action for display control of character information corresponding to a predetermined image sensing range of the camera.

6. The apparatus according to claim 1, wherein said storage device stores a program for operating an action for setting or operating a printer.

7. The apparatus according to claim 1, wherein said storage device stores a program for operating an action for transmitting electronic mail.

8. An information control apparatus having display means for displaying an image sensed by a camera on a display device of a remote user connected via a communication network comprising:
    a storage device adapted to store a program for displaying a separate window from the window for the sensed image in said display means, wherein the program is associated with an image sensing range of the camera;
    an acquisition device adapted to acquire information about a current image sensing range of the camera; and
    a control device adapted to automatically activate the program stored in said storage device when the current image sensing range of the camera acquired by said acquisition device matches with the image sensing range of the camera associated with the program, thereby executing display control of the separate window,
    wherein the separate window is configured to enable the user to actively control an object within the current image sensing range of the camera.

9. The apparatus according to claim 8, wherein said storage device stores programs for operating a plurality of different actions, and said control device performs control upon determining termination/continuation of display of a window in accordance with a type of action under activation when said acquisition device detects a change in the image sensing range of the camera in the presence of a program for which display control is being performed.

10. The apparatus according to claim 8, wherein said storage device stores a program for operating an action for display control of a window for displacing character information corresponding to a predetermined image sensing range of the camera.

11. The apparatus according to claim 8, wherein said storage device stores a program for operating an action for display control of a window for setting or operating a printer.

12. The apparatus according to claim 8, wherein said storage device stores a program for operating an action for display control of a window for transmitting electronic mail.

13. An information control method having a control step of controlling an image sensing range of a camera by a remote user connected via a communication network, comprising:
    storing a program for operating a predetermined action associated with the image sensing range of the camera;
    acquiring information about a current image sensing range of the camera; and
    automatically activating the program stored in the storing when the current image sensing range of the camera acquired in the acquiring matches with the image sensing range of the camera associated with the predetermined action,
    wherein the predetermined action is configured to enable the user to actively control an object within the current image sensing range of the camera.

14. The method according to claim 13, wherein the method further comprises the detection step of detecting whether a user has a control right to the camera, and the control step comprises activating the program stored in the storage step when it is detected in the detection step that the user has the control right to the camera.

15. The method according to claim 13, wherein the method further comprises the detection step of detecting whether the user has a control right to the camera, the storage step comprises storing programs for operating a plurality of different actions, and the control step comprises activating an action upon determining whether the action is an action to be activated while the user has the control right to the camera or an action to be activated even if the user does not have the control right to the camera.

16. The method according to claim 13, wherein the storage further comprises storing programs for operating a plurality of different actions, and the controlling further comprises performing control upon determining termination/continuation of operation of a program under activation in accordance with a type of action under activation when a change in the image sensing range of the camera is detected in the acquiring in the presence of the program under activation.

17. The method according to claim 13, wherein the storing further comprises storing a program for operating an action for display control of character information corresponding to a predetermined image sensing range of the camera.

18. The method according to claim 13, wherein the storing further comprises storing a program for operating an action for setting or operating a printer.

19. The method according to claim 13, wherein the storing further comprises storing a program for operating an action for transmitting electronic mail.

20. An information control method having a display step of displaying an image sensed by a camera on a display device of a remote user connected via a communication network, comprising:
   storing a program for displaying a separate window from the window for the sensed image in the display step, wherein the program is associated with an image sensing range of the camera;
   acquiring information about a current image sensing range of the camera; and
   automatically activating the program stored in the storing when the current image sensing range of the camera acquired in the acquiring matches with the image sensing range of the camera associated with the program, thereby executing display control of the seprate window,
   wherein the separate window is configured to enable the user to actively control an object within the current image sensing range of the camera.

21. The method according to claim 20, wherein the storing further comprises storing programs for operating a plurality of different actions, and the controlling further comprises performing control upon determining termination/continuation of display of a window in accordance with a type of action under activation when a change is the image sensing range of the camera is detected in the acquiring in the presence of a program for which display control is being performed.

22. The method according to claim 20, wherein the storage further comprises storing a program for operating an action for display control of a window for displaying character information corresponding to a predetermined image sensing range of the camera.

23. The method according to claim 20, wherein the storage further comprises storing a program for operating an action for display control of a window for setting or operating a printer.

24. The method according to claim 20, wherein the storage further comprises storing a program for operating an action for display control of a window for transmitting electronic mail.

25. A computer-readable medium used for an information control method having a control step of controlling an image sensing range of a camera by a remote user connected via a communication network, comprising program codes of:
   storing a program for operating a predetermined action associated with the image sensing range of the camera;
   acquiring information about a current image sensing range of the camera; and
   automatically activating the program stored in the storing when the current image sensing range of the camera acquired in the acquiring matches with the image sensing range of the camera associated with the predetermined action,
   wherein the predetermined action is configured to enable the user to actively control an object within the current image sensing range of the camera.

26. The medium according to claim 25, wherein the program further comprises a program code of the detection step of detecting whether a user has a control right to the camera, and the control step comprises activating the program stored in the storage step when it is detected in the detection step that the user has the control right to the camera.

27. The medium according to claim 25, wherein the program further comprises a program code of the detection step of detecting whether the user has a control right to the camera, the storage step comprises storing programs for operating a plurality of different actions, and the control step comprises activating an action upon determining whether the action is an action to be activated while the user has the control right to the camera or an action to be activated even if the user does not have the control right to the camera.

28. The medium according to claim 25, wherein the storing further comprises storing programs for operating a plurality of different actions, and the controlling further comprises performing control upon determining termination/continuation of operation of a program under activation in accordance with a type of action under activation when a change in the image sensing range of the camera is detected in the acquiring in the presence of the program under activation.

29. The medium according to claim 25, wherein the storing further comprises storing a program for operating an action for display control of character information corresponding to a predetermined image sensing range of the camera.

30. The medium according to claim 25, wherein the storing further comprises storing a program for operating an action 25 for setting or operating a printer.

31. The medium according to claim 25, wherein the storing further comprises storing a program for operating an action for transmitting electronic mail.

32. A computer-readable medium used for an information control method having a display step of displaying an image sensed by a camera on a display device of a remote user connnected via a communication network, comprising program codes of:
   storing a program for displaying a separate window from the window for the sensed image in the display step, wherein the program is associated with an image sensing range of the camera;
   acquiring information about a current image sensing range of the camera; and
   automatically activating the program stored in the storing when the current image sensing range of the camera acquired in the acquiring matches with the image sensing range of the camera associated with the program, thereby executing display control of the separate window,
   wherein the separate window is configured to enable the user to actively control an object within the current image sensing range of the camera.

33. The medium according to claim 32, wherein the storing further comprises storing programs for operating a plurality of different actions, and the controlling further comprises performing control upon determining terminiation/continuation of display of a window in accordance with a type of action under activation when a change in the image sensing range of the camera is detected in the acquiring in the presence of a program for which display control is being performed.

34. The medium according to claim 32, wherein the storing further comprises storing a program for operating an action for display control of a window for displaying character information corresponding to a predetermined image sensing range of the camera.

35. The medium according to claim 32, wherein the storing further comprises storing a program for operating an action for display control of a window for setting or operating a printer.

36. The medium according to claim 32, wherein the storing further comprises storing a program for operating an action for display control of a window for transmitting electronic mail.

37. An information control apparatus having control means for controlling an image sensing range of a camera by a remote user connected via a communication network, comprising:
   a storage device adapted to store a program for operating a predetermined action;
   an acquisition device adapted to acquire information about a current image sensing range of the camera; and
   a control device adapted to activate the program stored in said storage device in accordance with the information acquired by said acquisition device,
   wherein said storage device stores programs for operating a plurality of different actions, and said control device performs control upon determining termination/continuation of operation of a program under activation in accordance with a type of action under activation when said acquisition device detects a change in the image sensing range of the camera in the presence of the program under activation, and
   wherein the program under activation is configured to enable the user to actively control an object within the image sensing range of the camera.

38. An information control apparatus having display means for displaying an image sensed by a camera on a display device of a remote user connected via a communication network, comprising:
   a storage device adapted to store a program for displaying a window from the window for the sensed image in said display means, wherein the program is associated with an image sensing range of the camera;
   an acquisition device adapted to acquire information about a current image sensing range of the camera; and
   a control device adapted to automatically activate the program stored in said storage device when the current image sensing range of the camera acquired by said acquisition device matches with the image sensing range of the camera associated with the program, thereby executing display control of the separate window,
   wherein said storage device stores programs for operating a plurality of different actions, and said control device performs control upon determining termination/continuation of display of a window in accordance with a type of action under activation when said acquisition device detects a change in the image sensing range of the camera in the presence of a program for which display control is being performed, and
   wherein the program for which display control is being performed is configured to enable the user to actively control an object within the image sensing range of the camera.

39. An information control method having a control step of controlling an image sensing range of a camera by a remote user connected via a communication network, comprising:
   storing a program for operating a predetermined action associated with the image sensing range of the camera;
   acquiring information about a current image sensing range of the camera; and
   automatically activating the program stored in the storing when the current image sensing range of the camera acquired in the acquiring matches with the image sensing range of the camera associated with the predetermined action,
   wherein the storing further comprises storing programs for operating a plurality of different actions, and the controlling further comprises performing control upon determining termination/continuation of operation of a program under activation in accordance with a type of action under activation when a change in the image sensing range the camera is detected in the acquiring in the presence of the program under activation,
   wherein the program under activation is configured to enable the user to actively control an object within the image sensing range on the camera.

40. An information control method having a display step of displaying an image sensed by a camera on a display device of a remote user connected via a communication network, comprising:
   storing a program for displaying a separate window from the window for the sensed image in the display step, wherein the program is associated with an image sensing range of the camera;
   acquiring information about a current image sensing range of the camera; and
   automatically activating the program stored in the storing when the current image sensing range of the camera acquired in the acquiring matches with the image sensing range of the camera associated with the program, thereby executing display control of the seprate window,
   wherein the storing further comprises storing programs for operating a plurality of different actions, and the controlling further comprises performing control upon determining termination/continuation of display of a window in accordance with a type of action under activation when a change in the image sensing range of the camera is detected in the acquiring in the presence of a program for which display control is being performed, and
   wherein the program for which display control is being performed is configured to enable the user to actively control an object within the image sensing range of the camera.

41. A computer-readable medium used for an information control method having a control step of controlling an image sensing range of a camera by remote user connected via a communication network, comprising program codes of:
   storing a program for operating a predetermined action associated with the image sensing range of the camera;
   acquiring information about a current image sensing range of the camera; and
   automatically activating the program stored in the storing when the current image sensing range of the camera acquired in the acquiring matches with the image sensing range of the camera associated with the predetermined action, wherein the storing further comprises storing programs for operating a plurality of different actions, and the controlling further comprises performing control upon determining termination/continuation of operation of a program under activation in accordance with a type of action under activation when a change in the image sensing range of the camera is detected in the acquiring in the presence of the program under activation, wherein the program under activation is configured to enable the user to actively control an object within the image sensing range of the camera.

42. A computer-readable medium used for an information control method having a display step of displaying an image sensed by a camera on a display device of a remote user connected via a communication network, comprising program codes of:

storing a program for displaying a separate window from the window for the sensed image in the display step, wherein the program is associated with an image sensing range of the camera;

acquiring information about a current image sensing range of the camera; and automatically activating the program stored in the storing when the current image sensing range of the camera acquired in the acquiring matches with the image sensing range of the camera associated with the program, thereby executing display control of the separate window, wherein the storing further comprises storing programs for operating a plurality of different actions, and the controlling further comprises performing control upon determining termination/continuation of display of a window in accordance with a type of action under activation when a change in the image sensing range of the camera is detected in the acquiring in the presence of a program for which display control is being performed, wherein the program for which display control is being performed is configured to enable the user to actively control an object within the image sensing range of the camera.

* * * * *

UNITED STATES PATENT AND TRADEMARK OFFICE
CERTIFICATE OF CORRECTION

PATENT NO. : 6,977,672 B1
DATED : December 20, 2005
INVENTOR(S) : Yasuhiro Okuno It is certified that error appears in the above-identified patent and that said Letters Patent is hereby corrected as shown below:

Column 14,
Line 23, delete "displacing" and insert -- displaying --;
Line 64, delete "storage" and insert -- storing --;

Column 15,
Line 40, delete "is" and insert -- in --;
Lines 45, 50 and 54, delete "storage" and insert -- storing --;

Column 16,
Lines 66-67, delete "terminiation" and insert -- termination --; and

Column 18,
Line 38, delete "on" and insert -- of --.

Signed and Sealed this

Twenty-eighth Day of March, 2006

JON W. DUDAS
*Director of the United States Patent and Trademark Office*